United States Patent
Meyer (10) Patent No.: US 6,619,942 B2
(45) Date of Patent: Sep. 16, 2003

(54) TUBULAR FILM BLOWING HEAD

(75) Inventor: Ulrich Meyer, Ibbenbueren (DE)

(73) Assignee: Windmoeller & Hoelscher, Lengerich (DE)

( * ) Notice: Subject to any disclaimer, the term of this patent is extended or adjusted under 35 U.S.C. 154(b) by 98 days.

(21) Appl. No.: 09/930,489

(22) Filed: Aug. 16, 2001

(65) Prior Publication Data

US 2002/0037334 A1 Mar. 28, 2002

(30) Foreign Application Priority Data

Oct. 2, 2000 (DE) .......................................... 100 48 862
Aug. 16, 2000 (DE) .......................................... 100 39 930

(51) Int. Cl.$^7$ .............................................. B29C 47/90
(52) U.S. Cl. .................... 425/72.1; 425/326.1; 425/191
(58) Field of Search ............................ 425/326.1, 72.1, 425/133.1, 191, 381.2, 387.1

(56) References Cited

U.S. PATENT DOCUMENTS

| | | | | |
|---|---|---|---|---|
| 3,902,832 A | * | 9/1975 | Gregory et al. ............ | 425/72.1 |
| 3,930,768 A | * | 1/1976 | Zimmermann et al. .... | 425/72.1 |
| 4,111,630 A | * | 9/1978 | Shiomi et al. .............. | 425/462 |
| 4,182,603 A | * | 1/1980 | Knittel ...................... | 425/133.1 |
| 4,605,365 A | * | 8/1986 | Upmeier .................... | 425/72.1 |
| 5,538,411 A | * | 7/1996 | Gates ........................ | 425/133.1 |
| 5,738,881 A | * | 4/1998 | Sagar ........................ | 425/133.1 |

* cited by examiner

*Primary Examiner*—Robert Davis
*Assistant Examiner*—Joseph S Del Sole
(74) *Attorney, Agent, or Firm*—Jacobson Holman PLLC

(57) ABSTRACT

A tubular film blowing head is provided with one outer and one inner nozzle ring between which a ring chamber is formed extending in a conical or parabolic manner towards the circular nozzle gap and of which the inner nozzle ring, which is provided with a central bore for exchanging the pressurized air, is connected by means of a screw connection to a central cone piece of the blowing head. This central cone piece has a bore that is aligned to the central bore. In order to create a screw connection between the inner nozzle ring and the center cone piece that is firm and simple to produce, the inner nozzle ring is connected to the central cone piece by means of a threaded bolt penetrating the central bore of the nozzle ring and provided with an axial bore in that the threaded bolt is screwed into the bore of the cone piece, which is embodied as a threaded bore.

9 Claims, 7 Drawing Sheets

TUBULAR FILM BLOWING HEAD

BACKGROUND OF THE INVENTION

1. Field of the Invention

The invention relates to a tube film blowing head with one outer and one inner nozzle ring between which a ring chamber is formed extending in a conical or parabolic manner towards the circular nozzle gap and of which the inner nozzle ring, which is provided with a central bore for exchanging the pressurized air, is connected by means of a screw connection to a housing piece or a central cone piece of the blowing head having a bore that is aligned to the central bore.

2. Description of the Related Art

Figure 8:
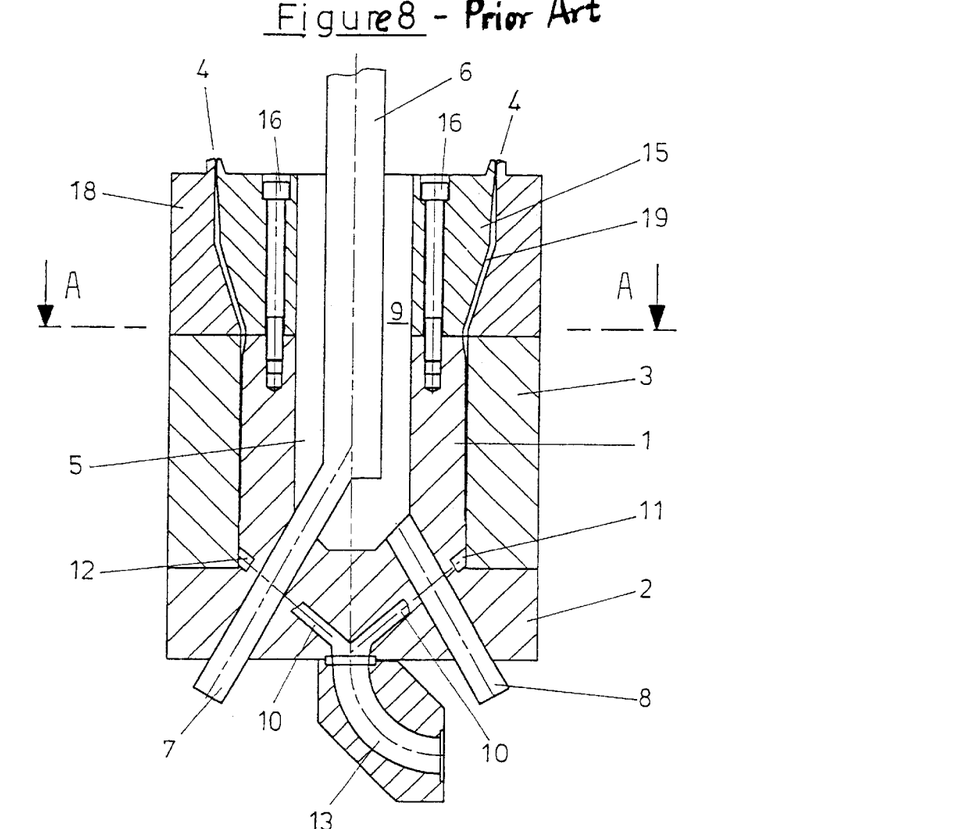
Figure 9:
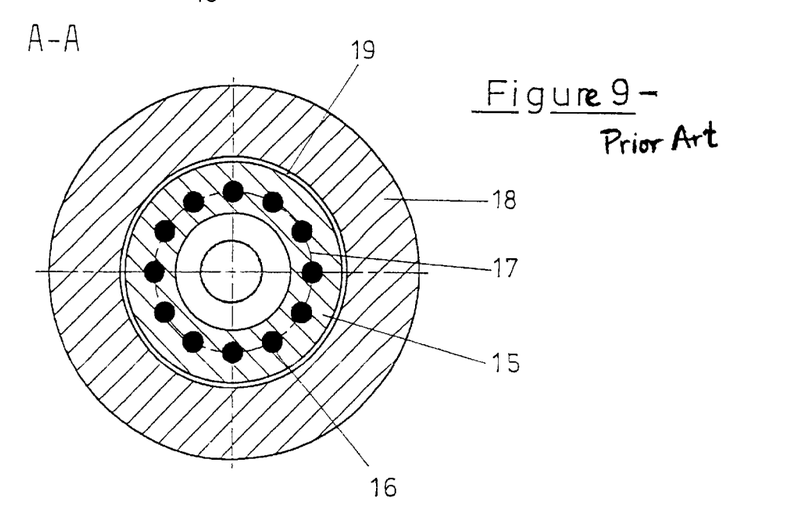

Such a known tube film blowing head, which is shown in FIGS. 8 and 9 of the drawings, comprises a central cylindrical cone piece 1, which is connected to a disc-shaped base 2 by way of a ring stage. The central cylindrical cone piece 1 is surrounded by a ring-shaped housing piece 3 that is supported in a sealing manner on the ring stage of the disc-shaped base by way of its lower, flat face. The ring-shaped housing piece 3 is connected to the disc-shaped base 2 by way of screws, which are not shown. A ring chamber is formed between the central cone piece 1 and the ring-shaped housing piece 3 surrounding it, which ring chamber is provided with the conventional spiral-shaped channels to the supply of the melt which, in its flow in the direction of the circular nozzle gap 4, increasingly flows away in the axial direction over the walls limiting the channels. The central cone piece 1 is provided with a central blind bore 5 in which protruding tube 6 is arranged. On the tube 6, a diagonally running tube 7 is arranged that passes through the lower region of the cone piece 1 and the disc-shaped base 2 in the manner shown. Diagonally running bores or lines 8 empty into the lower region of the blind bore 5 of the cone piece 1. Through the lines 8, pressurized air is supplied to the ring channel 9, which is formed between the blind bore 5 and the outer jacket of the tube 6, which pressurized air serves to extend and to cool the film tube that has been extruded and blown up to a tube bubble. The cooling air blown in then arrives in the upper, free end of the tube 6 and is removed by way of the tube 7 in a known manner. The disc-shaped base is provided with diagonally running bores 10, which empty into the beginning region of the spiral-shaped channels 11, 12. The bores 10, which run together, are connected to the line 13 supplying the melt in a known manner. The inner ring 15 of the extrusion nozzles is placed on the upper, flat, ring-shaped face of the cone piece 1 and is screwed onto the housing piece 1 by means of screws 16. The screws 16 penetrate the inner nozzle ring 15 in axial bores that are arranged in the manner shown in FIG. 8 at equal circumferential distances from one another in a circle 17 that is concentric to the center axis. The tension screws 16 are screwed into aligning threaded bores of the cylindrical cone piece 1. The inner nozzle ring 15 is surrounded by an outer nozzle ring 18 that is also connected to the ring-shaped housing piece 3 in a corresponding manner by means of screw connections. Between the inner and outer nozzle rings, a ring chamber 19 is formed whose lower end is adjacent to the ring chamber formed between the cone piece 1 and the ring-shaped housing piece 3. The ring chamber 19 formed between the two nozzle rings, which guides the melt to the nozzle gap 4, widens in the shape of a cone towards the nozzle gap 4 beginning from its lower end. This has the result that a higher hydraulic pressure is acting on the inner nozzle ring 15, which attempts to lift the inner nozzle ring from the cylindrical cone piece 1.

In order to achieve a sufficiently firm connection of the inner nozzle ring to the cone piece 1, as can be seen in FIG. 8, as many screws 16 as possible are provided for the purpose of connecting these two parts. In spite of the relatively high number of screws 16, together they have only one cross-section, which does not guarantee a sufficiently firm connection or creates a sufficiently firm connection only at great expense.

SUMMARY OF THE INVENTION

The object of the invention is therefore to create a screw connection between the inner nozzle ring and the center cone piece that is firm and simple to produce.

This object is attained according to the present invention with a tube film blowing head with one outer and one inner nozzle ring between which a ring chamber is formed extending in a conical or parabolic manner toward the circular nozzle gap. The inner nozzle ring is provided with a central bore for exchanging the pressurized air and is connected by means of a screw connection to a housing piece and/or a central cone piece of the blowing head having a bore that is aligned to the central bore. According to the present invention, the central bore of the inner nozzle ring is penetrated by an individual tension element also having an axial bore, by means of which the inner nozzle ring can be pressed against the central cone piece.

In accordance with a preferred embodiment of the invention, the inner nozzle ring is connected to the central cone piece by means of a threaded bolt penetrating its central bore and provided with an axial bore in that the threaded bolt is screwed into the bore of the cone piece that is embodied as a threaded bore.

Alternately, the inner nozzle ring is connected to the central cone piece by means of a threaded bolt provided with an axial bore in that the screw head of the threaded bolt is set into the cone piece and in that, in the region of the inner nozzle ring, a nut is screwed onto an outer thread of the threaded bolt and in that several tension screws for the purpose of tensing the inner nozzle ring relative to the central cone piece are arranged in the nut in an evenly spaced manner circumferentially.

The threaded bolt provided according to the invention can be embodied with such a large outer diameter that, in spite of the central bore penetrating it, it has a large cross sectional area that guarantees a high degree of firmness.

The threaded bolt according to the invention can be connected to the inner nozzle ring in a different manner and support itself on the inner nozzle ring. The threaded bolt can be provided with a head that is supported on the inner edge region of the inner ring.

If, because of the size of the threaded bolt, difficulties arise in pulling a head fixed to it against the inner nozzle ring in a firm manner, it is possible in another embodiment of the invention to provide for the head, which is embodied in the shape of a flange, to be provided with threaded bores that are concentric and parallel to the center line of the threaded bolt, into which threaded bores the screws supported on the inner ring may be screwed.

In accordance with another preferred embodiment, it is provided for the threaded bolt to be provided with a thread on its upper end as well onto which a nut is screwed that is supported on the inner nozzle ring.

The threaded bolt can also be provided with a thread on its upper end onto which a nut is screwed that is not supported directly on the inner nozzle ring, but rather is provided with threaded bores concentrically and parallel to the center line of the threaded bolt, into which threaded bores the screws supported on the inner ring may be screwed.

In accordance with another embodiment of the invention, whose use is particularly useful for a multi-layer film blowing head, it is provided for the inner ring to be provided with a recess forming a ring stage into which the head of the threaded bolt grips.

BRIEF DESCRIPTION OF THE DRAWINGS

Exemplary embodiments of the invention shall be described in the following with reference to the drawings, which show.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The tube film blowing heads that can be seen in FIGS. 1 to 5 correspond to the tube film blowing head described with reference to FIGS. 8 and 9 and only differ from this tube film blowing head in the manner of screwing of the inner nozzle ring 15 to the central cone piece 1 such that these tube film blowing heads need not be described again and corresponding parts are provided with the same reference characters.

Figure 1:
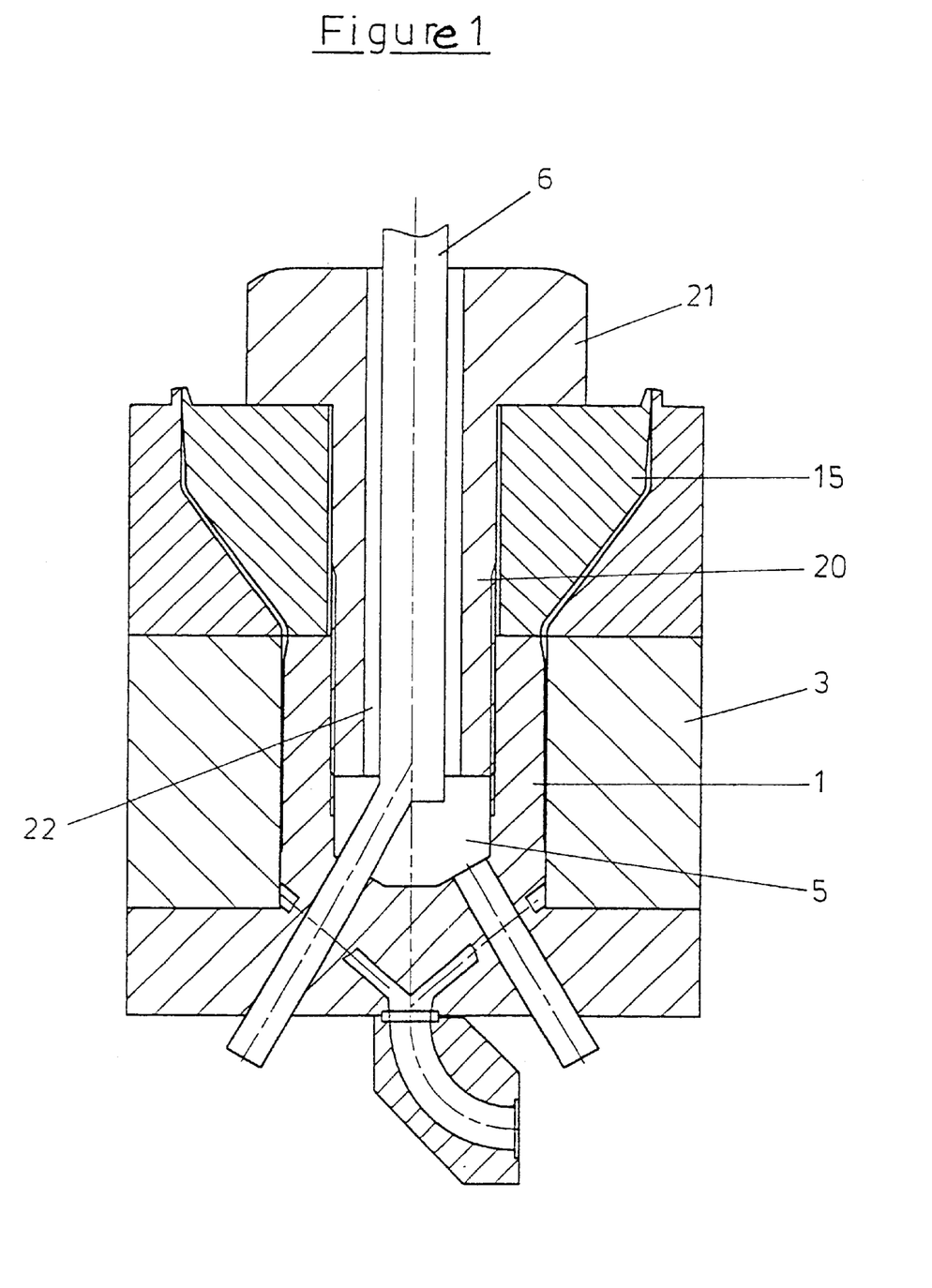
FIG. 1 a longitudinal section of a first embodiment of the blowing head according to the invention in which the inner nozzle ring is connected to the central cone by means of a threaded bolt provided with a head, FIG. 2 a depiction corresponding to that of FIG. 1 in which the central threaded bolt is provided with a head in the shape of a flange that is provided with bores into which the screws supported in the inner nozzle ring are screwed, FIG. 3 a depiction corresponding to that of FIG. 1 according to which the central threaded bolt is provided with a thread on its upper end as well, onto which a nut is screwed, FIG. 4 a section of the blowing head in accordance with FIG. 3 along the line B—B, FIG. 5 a depiction corresponding to that of FIG. 3 in which the nut provided on the central threaded bolt is provided with bores into which the screws supported on the inner nozzle ring are screwed, FIG. 6 a longitudinal section of a multi-layer tube film blowing head in which the inner nozzle ring is connected to the inner cone in a screwed manner by means of a threaded bolt, FIG. 7 a longitudinal section of another embodiment of the blowing head according to the invention, FIG. 8 a longitudinal section of a known embodiment of a tube film blowing head, and FIG. 9 a section of the tube film blowing head in accordance with FIG. 8 along the line A—A.

In the exemplary embodiment in accordance with FIG. 1, the bore of the cone piece 1 comprising a blind bore 5 is provided with a thread. The shaft of the hollow threaded bolt 20, which has been provided with a corresponding opposing thread, is screwed into this thread. The threaded bolt 20 is provided with a head 21 that is supported in the manner shown by way of its lower ring surface on the face surface of the inner ring 15 running parallel thereto. The threaded bolt 20 is provided with an axial central bore 22 penetrating on the head 21. Between this bore 22 and the tube 6, a ring chamber is formed through which the cooling pressurized air is blown into the tube film bubble, which is not shown.

Figure 2:
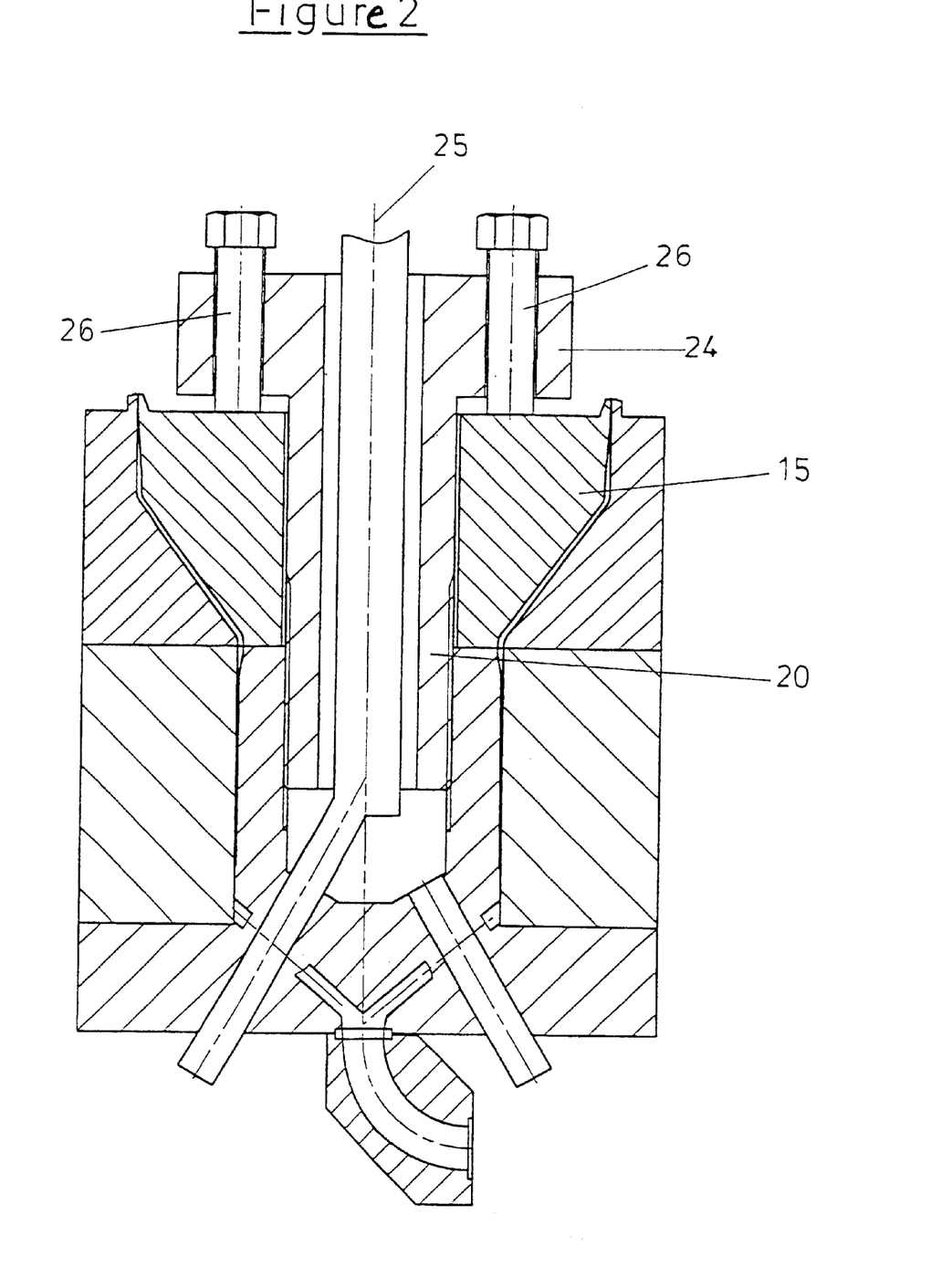

The exemplary embodiment in accordance with FIG. 2 differs from that of FIG. 1 by virtue of the fact that the hollow threaded bolt 20, which is screwed into the blind bore of the cone piece 1, is provided with a head 24 embodied in the shape of a flange, which is provided with threaded bores in a concentric circle with the center line 25 at identical circumferential distances from one another, into which screws 26 are screwed that are supported on the upper face surface of the inner nozzle ring 15.

Figure 3:
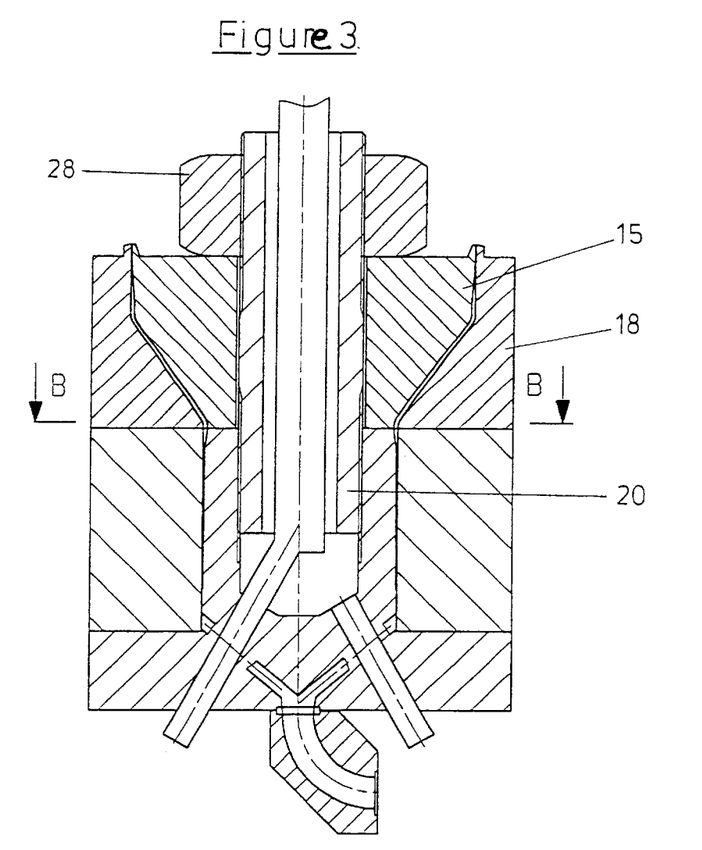
Figure 4:
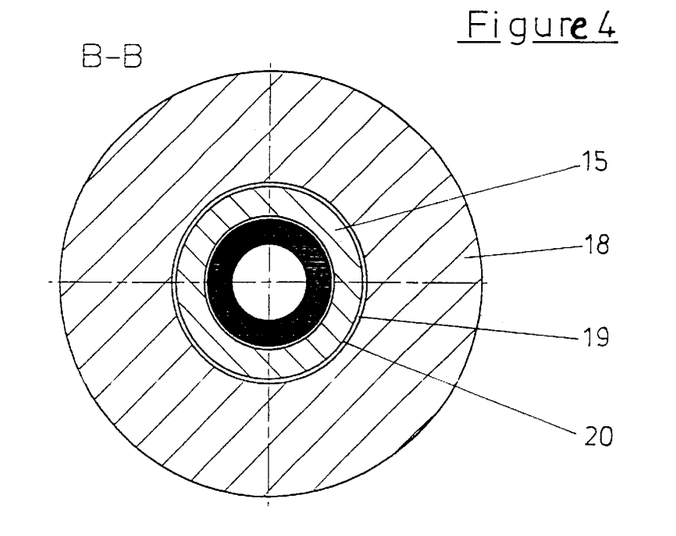

The exemplary embodiment in accordance with FIGS. 3 and 4 differs from that of FIGS. 1 and 2 by virtue of the fact that the hollow threaded bolt 20 is provided with a threaded bore on its upper end as well, onto which a nut 28 is screwed that is supported on the upper face surface of the inner nozzle ring 15. The threaded bolt 20 is provided with a thread-free section between its upper and lower threaded sections with which is it supported in a centering fashion in the bore of the inner nozzle ring 15.

Figure 5:
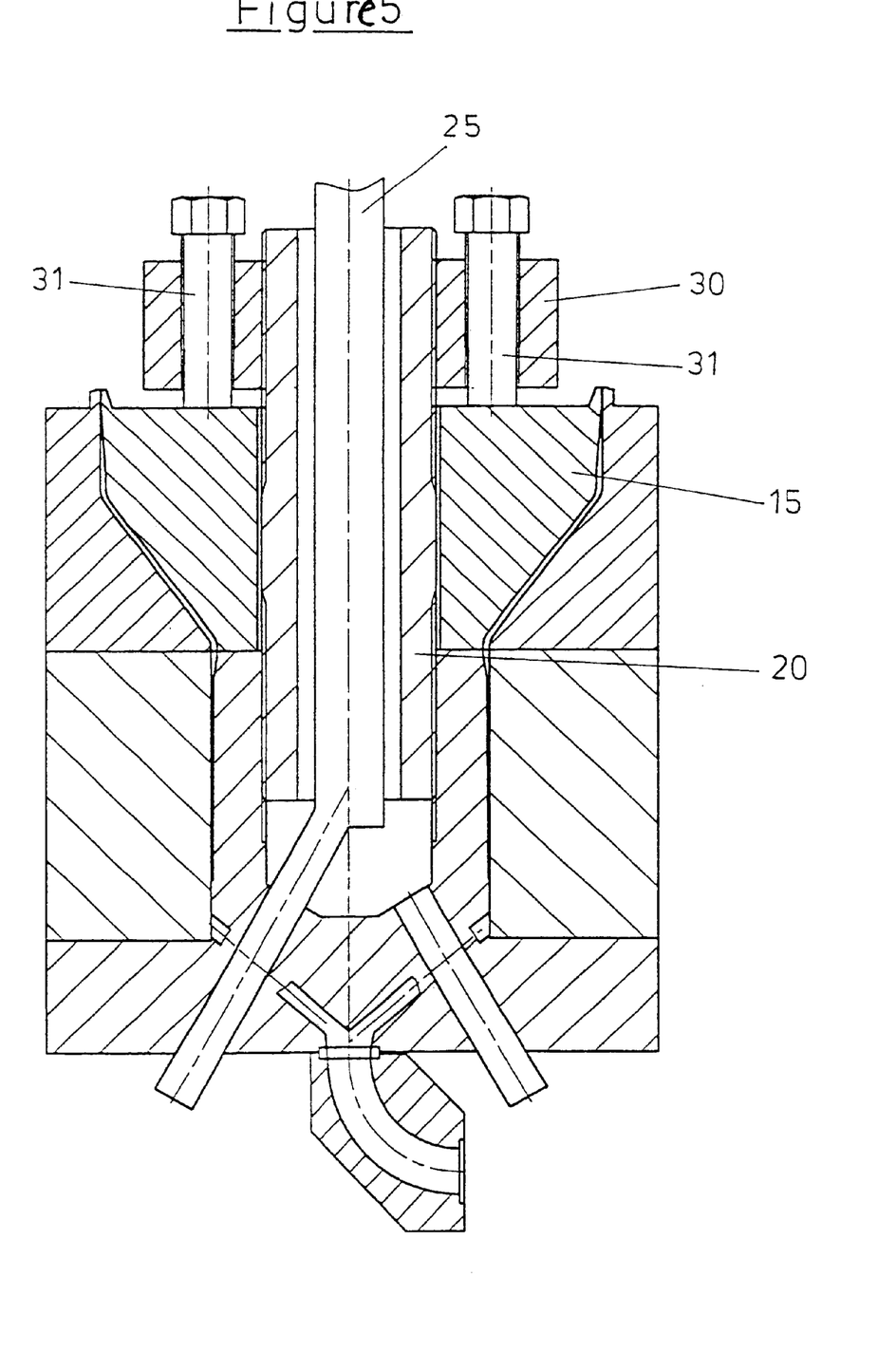

The exemplary embodiment in accordance with FIG. 5 differs from that of FIGS. 3 and 4 by virtue of the fact that the upper threaded section of the threaded bolt 20 comprises a disc 30 that is provided with threaded bores on a circle that is concentric to the center line 25 in equal circumferential distances, into which threaded bores screws 31 are screwed that are supported on the upper face surface of the inner nozzle ring 15.

Figure 6:
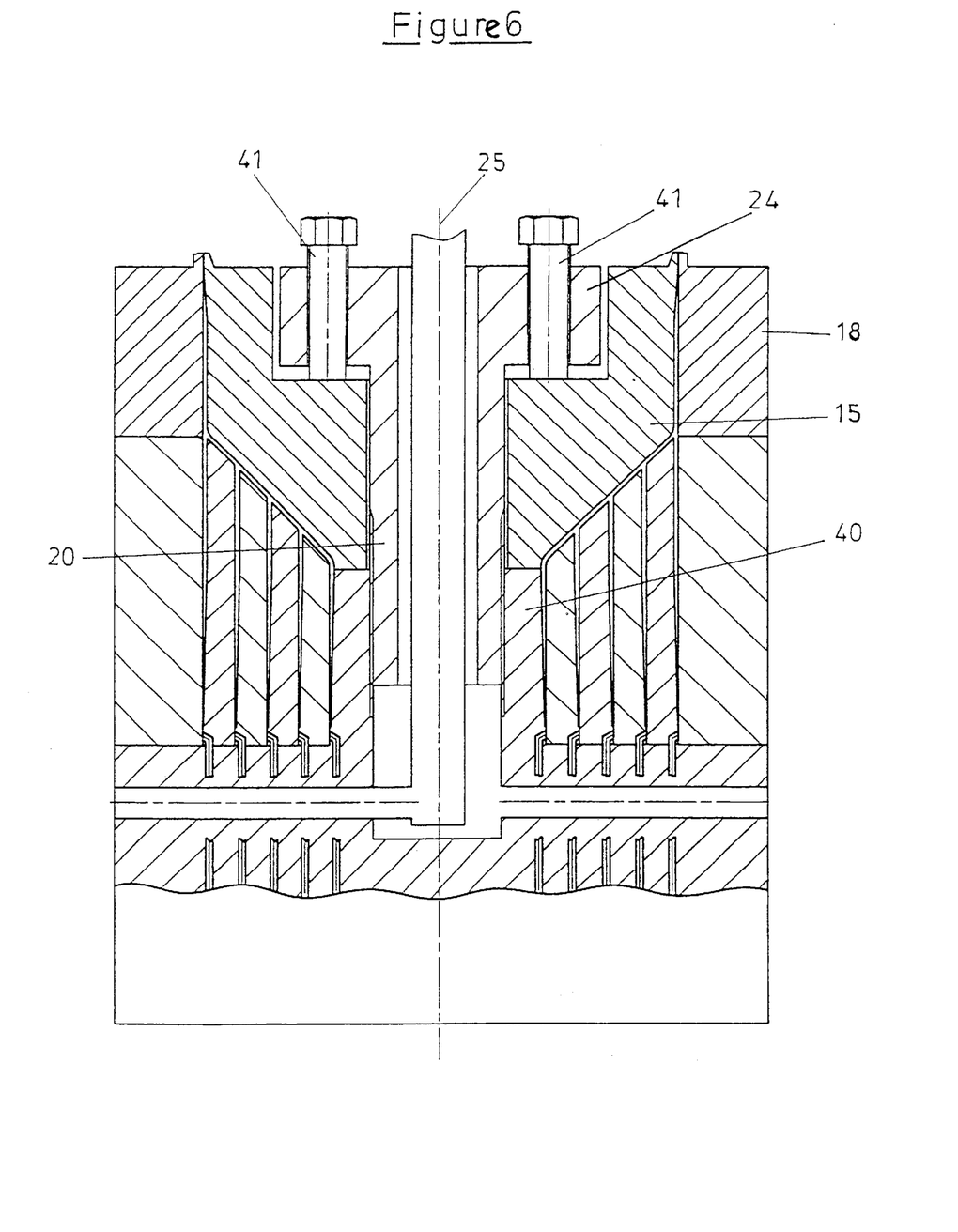

FIG. 6 shows a multi-layer tube film blowing head with an inner nozzle ring 15 and an outer nozzle ring 18 in which the inner cone comprises five concentrically arranged tubes. The inner tube 40 is provided with an inner thread into which the threaded bolt 20 is screwed. The threaded bolt 20 is provided with a flange-shaped head 24 that is provided with threaded bores arranged at equal circumferential distances from one another in a circle concentric to the center line 25, into which threaded bores screws 41 are screwed. The inner nozzle ring 15 is provided with a stage-shaped recess into which the flange-shaped head 24 grips. The screws screwed into the flange-shaped head 24 are supported on the ring surface of the inner nozzle ring 15, which is formed by the stage-shaped recess.

Figure 7:
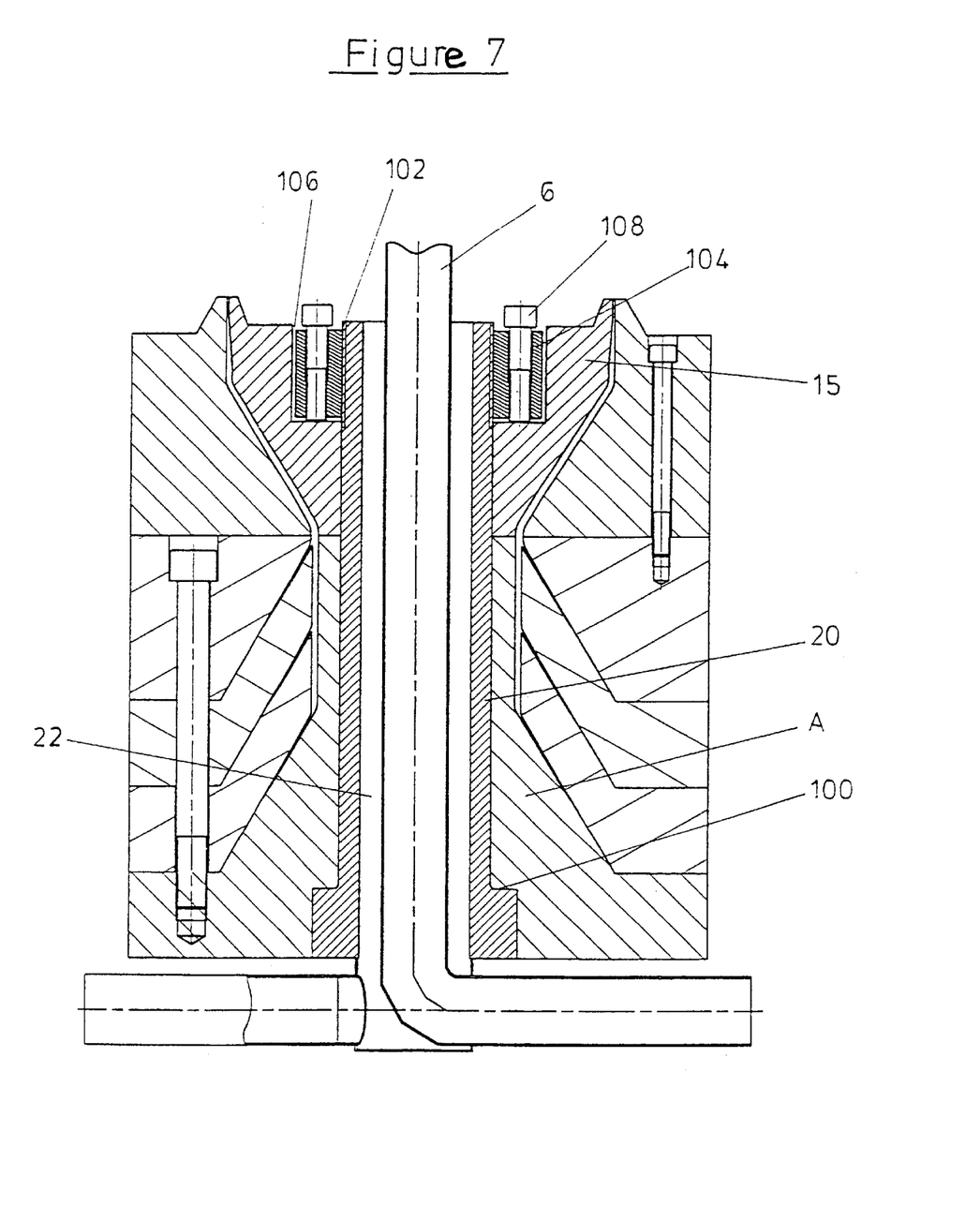

In the multi-layer tube film blowing head shown in FIG. 7, the inner nozzle ring 15 is compressed against the inner cone piece 1 by way of a tension element 20 that is embodied differently than in the previously described variant embodiments. The tension element 20 in accordance with the embodiment of FIG. 7 has a screw head 100 forming a step that is set into an adapted recess in the central cone piece 1, as is shown in FIG. 7. Here, the tension element 20 has a thread only in its end region, over which a nut 104 may be screwed, with the nut 104 coming to rest in a recess 106 in the inner nozzle ring 15. However, the corresponding lower contact surface of the nut 104 does not brace the inner nozzle ring 15 with the central cone piece 1. This task is performed here by the tension screws 108 that are arranged in an evenly distributed manner in the circumference of the nut 104. During assembly, the tension element 20 is placed into a correspondingly adapted recess of the central cone piece 1 by way of the screw head 100, which is embodied, for example, in a polygonal fashion. The inner nozzle ring 15 is attached, the nut 104 is screwed onto the thread 102 arranged in the end region of the tension element 20 until only a small distance remains between the lower surface of the nut 104 and the inner nozzle ring. The tension screws 108 are then tensed in the inner nozzle ring 15 relative to the central cone piece 1.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A tube film blowing head comprising an outer nozzle ring and an inner nozzle ring between which a ring chamber is formed extending in a conical or parabolic manner towards a nozzle gap, said inner nozzle ring having a first central bore, a central cone piece having a second threaded central bore axially aligned with said said first central bore, and a tension element which penetrates and is concentric with both of said first central bore and said second threaded central bore, said tension element having an axial bore for exchanging pressurized air and threads on a lower portion thereof by which said tension element is screwed into said second threaded central bore to press the inner nozzle ring against said central cone piece.

2. The tube film blowing head as set forth in claim 1, wherein said tension element includes a bolt having a head that is supported on an inner edge region of said inner nozzle ring.

3. The tube film blowing head as set forth in claim 2, wherein the head has a flange shape and is provided with a plurality of threaded bores arranged concentrically and substantially parallel to a center line of said bolt into which screws are screwed that are supported on said inner nozzle ring.

4. The tube film blowing head as set forth in claim 1, wherein said tension element further includes threads on an upper portion thereof onto which a nut is screwed.

5. The tube film blowing head as set forth in claim 4, wherein said nut is provided with threaded bores that are arranged concentrically and substantially parallel to a center line of said tension element, into which screws are screwed that are supported on said inner nozzle ring.

6. The tube film blowing head as set forth in claim 2, wherein said inner nozzle ring is provided with a recess forming a ring stage into which the head of the bolt grips.

7. A tube film blowing head comprising:
an outer nozzle ring and an inner nozzle ring between which a ring chamber is formed extending in a conical or parabolic manner towards a nozzle gap, said inner nozzle ring having a central bore;
a central cone piece having a bore axially aligned with said central bore;
a single threaded tension element penetrating said central bore and said bore for pressing the inner nozzle ring against said central cone piece, said tension element having an axial bore for exchanging pressurized air and a flange-shaped head that is provided with threaded bores arranged concentrically and substantially parallel to a center line of said tension element into which threaded bores screws are screwed that are supported on said inner nozzle ring.

8. A tube film blowing head comprising:
an outer nozzle ring and an inner nozzle ring between which a ring chamber is formed extending in a conical or parabolic manner towards a nozzle gap, said inner nozzle ring having a central bore;
a central cone piece having a bore axially aligned with said central bore;
a threaded bolt having an axial bore for exchanging pressurized air, said threaded bolt penetrating said central bore and said bore for pressing the inner nozzle ring against said central cone piece; and
a nut screwed onto an upper end of said threaded bolt and having threaded bores that are arranged concentrically and substantially parallel to a center line of said bolt, into which bores screws are screwed that are supported on said inner nozzle ring.

9. A tube film blowing head comprising:
an outer nozzle ring and an inner nozzle ring between which a ring chamber is formed extending in a conical or parabolic manner towards a nozzle gap, said inner nozzle ring having a central bore;
a central cone piece having a bore aligned with said central bore; and
a bolt having an axial bore for exchanging pressurized air and a threaded end region, said bolt penetrating said central bore and said bore for pressing the inner nozzle ring against said central cone piece, a screw head of said bolt being set into said cone piece and, in a region of said inner nozzle ring, a nut being screwed onto said threaded end region of said bolt with several tension screws for tensioning the inner nozzle ring relative to the central cone piece being arranged in the nut and evenly distributed on a circumference thereof.

* * * * *